United States Patent [19]

Hager et al.

[11] Patent Number: 5,380,902
[45] Date of Patent: Jan. 10, 1995

[54] PROCESS FOR THE CONDENSATION AND/OR EQUILIBRATION OF ORGANOSILICON COMPOUNDS

[75] Inventors: Rudolf Hager, Altoetting; Otto Schneider, Burghausen; Johann Schuster, Emmerting, all of Germany

[73] Assignee: Wacker-Chemie GmbH, Munich

[21] Appl. No.: 250,884

[22] Filed: May 31, 1994

[30] Foreign Application Priority Data

May 28, 1993 [DE] Germany .............................. 4317909

[51] Int. Cl.$^6$ .......................... C07F 7/08; C08G 77/06
[52] U.S. Cl. ...................................... 556/462; 556/450; 528/21; 528/23
[58] Field of Search ............... 556/462, 450, ; 528/23, 528/21

[56] References Cited

U.S. PATENT DOCUMENTS

| | | | |
|---|---|---|---|
| 3,398,117 | 8/1968 | Baronnier et al. | 556/462 X |
| 3,477,988 | 11/1969 | Ostrozynski | 528/23 |
| 3,839,388 | 10/1974 | Nitzsche et al. | |
| 4,008,261 | 2/1977 | Brown et al. | 556/462 |
| 4,895,968 | 1/1990 | Buese et al. | 556/462 |
| 5,008,229 | 4/1991 | Schuster et al. | |
| 5,138,008 | 8/1992 | Montague et al. | 528/21 |
| 5,210,129 | 5/1993 | Habimana et al. | 528/21 X |
| 5,210,131 | 5/1993 | Gilson et al. | 528/23 X |

FOREIGN PATENT DOCUMENTS 2229514 1/1979 Germany .
3903137 8/1990 Germany .

OTHER PUBLICATIONS

Inorg. Phys. Theor., "A New and Simple Method of Preparing Dichlorophosphinylphosphorimidic Trichloride", J. Emsley et al.
J. Am. Chem. Soc., 1985, 107, 5166–5177, "Conformation, Bonding; and Flexibility in Short-Chain Linear Phosphazenes", H. R. Allcock et al.
Macromolecules 1992, 25, 1254–1258, "Synthesis of Poly(dichlorophosphazenes) from $Cl_3P=NP(O)Cl_2$", G. D'Halluin et al.

*Primary Examiner*—Paul F. Shaver
*Attorney, Agent, or Firm*—Martin Connaughton

[57] ABSTRACT

A process for the condensation and/or equilibration of organosilicon compounds in the presence of oxygen-containing phosphazenes, in particular those of the formula $$Y-PCl_2=N(-PCl_2=N)_n-PCl_2O \quad \quad (I),$$

in which
  Y represents a chlorine atom or the hydroxyl group and
  n represents 0 or an integer from 1 to 8, and/or condensation products thereof.

7 Claims, No Drawings

PROCESS FOR THE CONDENSATION AND/OR EQUILIBRATION OF ORGANOSILICON COMPOUNDS

FIELD OF INVENTION

The present invention relates to a process for the preparation of organopolysiloxanes by condensation and/or equilibration reactions in the presence of oxygen-containing phosphazenes.

The term organopolysiloxanes in the context of the present invention is understood as meaning oligomeric siloxanes.

BACKGROUND OF INVENTION

The preparation of organopolysiloxanes by condensation and/or equilibration reactions in the presence of phosphorus-nitrogen compounds as catalysts is already known. Chlorophosphazenes, often called phosphorus nitrile chlorides or phosphorus nitride chlorides, are used here as phosphorus-nitrogen compounds, because of their relatively easy accessibility. Reference may be made to DE 22 29 514 B (Wacker-Chemie GmbH, published Apr. 20, 1978) and corresponding U.S. Pat. No. 3,839,388 (issued Oct. 1, 1974), in which chlorophosphazenes having a ratio of phosphorus to nitrogen of greater than 1 and dissolved in halogenohydrocarbons are described. DE 3903137 A (Wacker-Chemie GmbH, published on Aug. 16, 1990) and the corresponding U.S. Pat. No. 5,008,229 (issued Apr. 16, 1991) further describe chlorophosphazenes which are dissolved in halogen-free organic solvents, but only with addition of solubilizing agents.

SUMMARY OF INVENTION

The present invention relates to a process for the condensation and/or equilibration of organosilicon compounds in the presence of oxygen-containing phosphazenes.

The oxygen-containing phosphazenes employed according to the invention are preferably oxygen-containing chlorophosphazenes of the formula $$Y-PCl_2=N(-PCl_2=N)_n-PCl_2O \quad (I),$$

in which
Y is a chlorine atom or the hydroxyl group and
n is 0 or an integer from 1 to 8, preferably from 0 to 4, more preferably 1 to 3,
and/or condensation products thereof.

If Y is the hydroxyl group, the following tautomerism exists

where n has the above meaning, the equilibrium generally being more on the left-hand side, at compound (I), at pH <7, and more on the right-hand side at compound (I'), at pH >7.

Where Y is the hydroxyl group and where phosphazenes have more than 3 phosphorus atoms, there are further canonical structures which relate to the central chain members, for example,

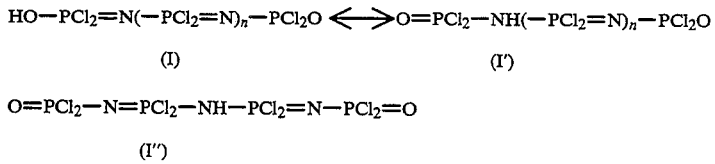

$$O=PCl_2-N=PCl_2-NH-PCl_2=N-PCl_2=O$$
(I'')

All statements regarding compounds of formula (I) where Y is OH are intended to apply without restriction to tautomeric compounds such as those of formulae (I') and (I'').

Although not expressed by formula (I), all or some of the chlorine atoms can be replaced by radicals Q, in which Q represents the hydroxyl group, monovalent organic radicals, such as alkoxy radicals or aryloxy radicals, halogen atoms other than chlorine, organosilicon radicals and phosphorus-containing radicals.

The oxygen-containing chlorophosphazenes of formula (I) are preferably those in which no chlorine atom is replaced by a radical Q.

The condensation products according to the invention of the oxygen-containing chlorophosphazenes of formula (I) can be any desired condensation products. For example, if the condensation process proceeds on the terminal phosphorus atoms of two oxygen-containing chlorophosphazenes by splitting off of HCl or water, oxygen-containing phosphazenes of formula (I) in which Y represents $-O-PCl_2=N(-PCl_2=N)n-PCl_2O$, where n has the above meaning, are obtained. In condensation reactions on nonterminal phosphorus atoms, especially if at least one chlorine atom in formula (I) represents the radical Q as a hydroxyl radical, oxygen-containing phosphazenes of formula (I) in which Q represents phosphorus-containing radicals, such as $-N=P\equiv$ and $-O-P\equiv$, are formed.

Examples of the oxygen-containing chlorophosphazenes employed are $PCl_3=N-PCl_2O$, $PCl_3=N-P-MeClO$, $PCl_3=N-P(OPh)_2O$, $PCl_3=N-P-Me(OPh)O$, $PCl_3=N-PEt_2O$, $PCl_3=N-PCl_2-=N-PCl_2O$, $PCl_3=N(-PCl_2=N)_2-PCl_2O$, $PCl_3-N(-PCl_2=N)_3-PCl_2O$, $PCl_3=N(-PCl_2=N)_4-PCl_2O$, $PCl_3=N(-PCl_2=N)_5-PCl_2O$, $PCl_3=N(-PCl_2=N)_6-PCl_2O$, $PCl_3=N-PCl(N=PCl_3)-PCl_2O$, $PCl_3=N-P(N=PCl_3)_2-PCl_2O$, $HO-PCl_2=N-PCl_2O$, $HO-PCl_2=N-P(OPh)_2O$, $HO-PPh_2=N-PCl_2O$, $HO-PCl_2=N-PEt_2O$, $HO-PCl_2=N-PCl_2=N-PCl_2O$, $HO-PCl_2=N(-PCl_2=N)_2-PCl_2O$, $HO-PCl_2=N(-PCl_2=N)_3-PCl_2O$, $HO-PCl_2=N(-PCl_2=N)_4-PCl_2O$, $HO-PCl_2=N(-PCl_2=N)_5-PCl_2O$, $HO-PCl_2=N(-PCl_2=N)_6-PCl_2O$, $HO-PCl_2=N-PCl(N=PCl_3)-PCl_2O$, $HO-PCl_2=N-P(N=PCl_3)_2-PCl_2O$, $HO-PCl_2=N-PCl(OH)=N-PCl_2O$, $HO-PCl_2=N-PCl_2-$ =N—PCl(OH)=N—PCl$_2$O, HO—PCl$_2$=N—P(N=PCl$_2$OH) (N=PCl$_3$)—PCl$_2$O, OPCl$_2$=N—PCl$_2$—O—PCl$_2$=N—PCl$_2$O, OPCl$_2$(—N=PCl$_2$)$_2$—O—(PCl$_2$=N—)$_2$PCl$_2$O—, OPCl$_2$(—N=PCl$_2$)$_3$—O—(PCl$_2$=N—)$_3$PCl$_2$O, HO—PCl(OBu)=N—PCl(OBu)=N—PCl(OBu)O, HO—PCl(OPh)=N—PCl(OPh)=N—PCl(OPh)O, HO—PCl$_2$=N—PCl(OPCl$_2$=N—PCl$_2$=N—PCl$_2$O)=N—PCl$_2$O and HO—PCl$_2$=N—PCl$_2$=N—PCl(OSiMe$_2$-[OSiMe$_2$]$_{10}$OH)=N—PCl$_2$O, where PCl$_3$=N—PCl$_2$O, PCl$_3$=N—PCl$_2$=N—PCl$_2$O, PCl$_3$=N(—PCl$_2$=N-)$_2$—PCl$_2$O, PCl$_3$=N(—PCl$_2$=N)$_3$—PCl$_2$O, PCl$_3$=N(—PCl$_2$=N)$_4$—PCl$_2$O, HO—PCl$_2$=N—PCl$_2$O, HO—PCl$_2$=N—PCl$_2$=N—PCl$_2$O, HO—PCl$_2$=N(PCl$_2$=N)$_2$—PCl$_2$O, HO—PCl$_2$=N(—PCl$_2$=N)$_3$—PCl$_2$O, HO—PCl$_2$=N(—PCl$_2$=N-)$_4$—PCl$_2$O, OPCl$_2$=N—PCl$_2$—O—PCl$_2$=N—PCl$_2$O, OPCl$_2$(—N=PCl$_2$)$_2$—O—(PCl$_2$=N—)$_2$PCl$_2$O and OPCl$_2$(—N=PCl$_2$)$_3$—O—(PCl$_2$=N-)$_3$PCl$_2$O are preferably employed and PCl$_3$=N—PCl$_2$=N—PCl$_2$O, PCl$_3$=N(—PCl$_2$=N)$_2$—PCl$_2$O, PCl$_3$=N(—PCl$_2$=N-)$_3$—PCl$_2$O, HO—PCl$_2$=N—PCl$_2$=N—PCl$_2$O, HO—PCl$_2$=N(—PCl$_2$=N)$_2$—PCl$_2$O and HO—PCl$_2$=N(—PCl$_2$=N)$_3$—PCl$_2$O are more preferably employed, where Me is the methyl radical,
Et is the ethyl radical,
Bu is the n-butyl radical and
Ph is the phenyl radical.

Oxygen-containing phosphazenes and processes for their preparation are already known. Reference may be made to J. Emsley et al., J. Chem. Soc. A (1971) page 2863 et seq, where the reactions of phosphorus pentachloride with oxygen-containing compounds, such as hydroxylamine, phosphoryl chloride, amidophosphoric acids, nitrogen oxides and sulfates, which are suitable for preparation of short-chain phosphorylchlorophosphazenes, in particular dichlorophosphinylphosphorimide trichloride, are described. The group —PCl$_2$O is called the phosphoryl group. According to the statements by H. R. Allcock et al., in J. Am. Chem. Soc. 107 (1985) page 5167 et seq, longer oxygen-containing chlorophosphazenes can be prepared if ionic chlorophosphazenes are employed instead of phosphorus pentachloride. R. DeJaeger et al., Macromolecules 25 (1992) 1254 et seq, discloses the preparation of longer-chain phosphorylchlorophosphazenes by heat treatment of short-chain phosphorylchlorophosphazenes. Furthermore, oxygen-containing phosphazenes can be prepared by reaction of ionic phosphazenes with compounds containing hydroxyl groups.

The amounts used of the oxygen-containing phosphazenes can be the same as in the processes known to date for preparation of organosilicon compounds by condensation and/or equilibration. Because of the high activity of the oxygen-containing phosphazenes employed according to the invention, lower amounts than in the processes known to date are completely adequate.

The oxygen-containing chlorophosphazenes which are active as a catalyst for promotion of condensation and/or equilibration reactions of organosilicon compounds are preferably employed in amounts of 0.1 to 1,000 ppm by weight (parts per million by weight), more preferably 1 to 300 ppm by weight, based on the total weight of the organosilicon compounds to be subjected to condensation and/or to be equilibrated.

The oxygen-containing phosphazenes can be employed in the process as pure substances, especially if they are liquid. However, they can also be employed as a mixture with substances which do not react, or at least do not react within a short time, with the oxygen-containing chlorophosphazenes in a manner such that their accelerating action on the condensation and/or equilibration of organosilicon compounds is noticeably reduced.

The oxygen-containing phosphazenes are preferably employed in the process as a mixture with a halogen-free organic solvent, where solvents or solvent mixtures having a boiling point or boiling point range under normal pressure of up to 160° C., in particular up to 120° C., are preferred.

Examples of such solvents are alcohols, such as methanol, ethanol, n-propanol, iso-propanol and n-butanol, carboxylic acids, such as formic acid and acetic acid, ethers, such as dioxane, tetrahydrofuran, diethyl ether and diethylene glycol dimethyl ether, esters, such as methyl acetate, ethyl acetate, n- and iso-propyl acetate, diethyl carbonate and ethyl formate, hydrocarbons, such as pentane, n-hexane, a hexane isomer mixture, cyclohexane, heptane, octane, wash benzine, petroleum ether, benzene, toluene and xylenes, ketones, such as acetone, methyl ethyl ketone, diethyl ketone and methyl isobutyl ketone, amides, such as dimethylformamide and N-methylpyrrolidone, and mixtures of these solvents, where hydrocarbons, in particular toluene and xylenes, and esters, in particular ethyl acetate, are more preferred.

If the oxygen-containing chlorophosphazenes are employed in the process as a mixture with halogen-free organic solvents, the concentration or oxygen-containing phosphazene is preferably 0.01% to 50% by weight, more preferably 0.1% to 20% by weight, based on the weight of the mixture.

If desired, the oxygen-containing phosphazenes can also be employed as a mixture with halogen-containing solvents, but is usually not desirable, particularly in the toxicological respect.

Any desired organosilicon compounds which has been subjected to condensation and/or to equilibrate to date in the presence of catalysts based on phosphazene can be employed as the organosilicon compound in the process.

Condensation reactions of organosilicon compounds are, in particular, the reactions of two Si-bonded hydroxyl groups with elimination of water, and the reaction of an Si-bonded hydroxyl group with an Si-bonded alkoxy group with elimination of alcohol, or with Si-bonded halogen with elimination of hydrogen halide.

Equilibration reactions are understood as meaning the rearrangements of siloxane bonds of siloxane units.

Condensation and equilibration reactions often proceed simultaneously.

Organosilicon compounds which can be employed in the process are known and are often represented by the formulas

   (II)

and

   (III)

in which
R is identical or different and represents a hydrogen atom or monovalent, optionally substituted hydrocarbon radicals, X is identical or different and represents the hydroxyl group, a radical —$OR^1$, where $R^1$ is a monovalent organic radical, —$OSiR_3$, where R has the above meaning, or is a halogen atom, a is 0 or an integer of at least 1, preferably 2 to 1,000, more preferably 2 to 500, and b is an integer having a value of 3 to 12, preferably 4 to 8, more preferably 4.

Although not shown by the formulas often used, up to 5 mole% of the diorganosiloxane units can be replaced by other siloxane units, such as $RSiO_{3/2}$ and/or $SiO_{4/2}$ units, in which R has the meaning given above.

The radical R is preferably a hydrogen atom or represents hydrocarbon radicals having 1 to 18 carbon atoms, where hydrocarbon radicals having 1 to 4 carbon atoms, in particular the methyl radical, are more preferred.

Examples of R are alkyl radicals, such as the methyl, ethyl, n-propyl, iso-propyl, n-butyl, iso-butyl, tert-butyl, n-pentyl, iso-pentyl, neo-pentyl, tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radicals, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexl and the 3-norbornenyl radical; cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenylyl, naththyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of monovalent substituted hydrocarbon radical R are cyanoalkyl radical, such as the β-cyanoethyl radical, haloalkyl radicals, such as the 3,3,3-trifluoropropyl radical and the γ-chloropropyl radical, haloaryl radicals, such as o-, m- and p-chlorophenyl radicals, the 3-hydroxypropyl radical and acyloxy-alkyl radicals, such as the γ-acryloxypropyl radical and the γ-methacryloxypropyl radical.

Radical $R^1$ is preferably alkyl radicals having 1 to 4 carbon atoms, more preferably the methyl and the ethyl radical.

The viscosity of the organosilicon compounds of formula (II) employed in the process according to the invention is preferably between 0.6 and $10^6$ mm²/s at a temperature of 25° C., more preferably between 10 and $10^4$ mm²/s.

Examples of compounds of formula (II) are α,w-dihydroxydimethylpolysiloxane having a viscosity of 80 mm²/s at 25° C., α,w-dihydroxydimethylpolysiloxane having a viscosity of 20,000 mm²/s at 25° C., α,w-dichlorodimethylpolysiloxane having a viscosity of 40 mm²/s at 25° C., α,w-bis(trimethylsiloxy)polymethylhydridosiloxane having a viscosity of 25 mm² /s at 25° C., α,w-bis(trimethylsiloxy)polydimethylsiloxane having a viscosity of 20 mm²/s at 25° C., hexamethyldisiloxane and 1,3-divinyl-1,1,3,3-tetramethyldisiloxane.

Examples of compounds of formula (III) are hexamethylcyclotrisiloxane, octamethylcyclotetrasiloxane and decamethylcyclopentasiloxane.

If X in formula (II) represents —$OSiR_3$, where R has the above meaning, the compounds are organosilicon compounds which regulate the chain length.

Any desired organosilicon compounds which regulate the chain length which has been possible to co-use in the processes known to date for condensation and/or equilibration in the presence of a catalyst based on phosphazene can furthermore be employed in the process according to the invention.

Such organosilicon compounds which regulate the chain length are preferably, in addition to the compounds of formula (II) where X is —$OSiR_3$, those of the formula

$$R^2{}_3{}^2SiZ \qquad (IV),$$

in which $R^2$ is identical or different and has one of the meanings given for R and Z is a hydroxyl group, the radical —$OR^1$ where $R^1$ is a monovalent organic radical, or a halogen atom.

Examples of the radical $R^2$ are the examples given for R as an organic radical.

Z is preferably the hydroxyl group, a chlorine atom, the methoxy radical or the ethoxy radical.

Examples of compounds of formula (IV) are trimethylchlorosilane and trimethylmethoxysilane.

The amount of organosilicon compound employed which regulates the chain length depends on the desired level of the molecular weight of the organopolysiloxanes prepared by condensation and/or equilibration and is already know.

The organosilicon compounds employed are commercially available products or can be prepared by processes customary in silicone chemistry.

The individual constituents employed in the process can be one type of such constituents or a mixture of such constituents.

The temperatures and pressures used in the process can also be the same as those in the processes known to date for condensation and/or equilibration of organosilicon compounds.

The condensation and/or equilibration reactions are preferably carried out at 50° C. to 200° C., more preferably 80° C. to 160° C.

The condensation and/or equilibration reactions can be carried out under a pressure of the surrounding atmosphere of 900 to 1100 hPa. To facilitate removal of the by-products formed during the condensation such as water, HCl or alcohol, the condensation and/or equilibration of the organosilicon compounds is preferably carried out under a pressure below 80 kPa. However, the condensation, in particular the equilibration, can also be carried out under higher pressures.

The process can be carried out either batchwise of continuously.

After the desired viscosity has been reached, the viscosity of the organosilicon compound obtained in the context of the process can be kept constant by a procedure in which the catalyst used, or a reaction product which has been formed from this catalyst by reaction with the organosilicon compound to be subjected to condensation and/or to be equilibrated and likewise promotes the condensation and/or equilibration of organosilicon compounds, is inhibited or deactivated by addition of inhibitors or deactivators which have been employed to date in connection with phosphazenes, such as triisononylamine, n-butyllithium, lithium siloxanolate, hexamethyldisilazane and magnesium oxide.

In order to ensure a good distribution of the components employed in the process, the mixture of these substances is preferably agitated while the process is carried out.

The organopolysiloxanes prepared, in particular linear organopolysiloxanes, can be used for all purposes. It has also been possible to employ linear organopolysiloxanes produced by condensation and/or equilibration of organosilicon compounds by processes known to date for care agents and cosmetic formulations, as thread lubricants, for the preparation of organopolysiloxane elastomers, in which case crosslinking can be carried out by condensation, addition of Si-bonded hydrogen onto SiC-bonded vinyl groups or by formation of free radicals, depending on the nature of the terminal units of the linear organopolysiloxanes, and for the production of coatings which repel tacky substances.

The process according to the invention has the advantage that it is easy to carry out and high yields are achieved.

The oxygen-containing chlorophosphazenes which are employed and promote the condensation and equilibration processes show a high activity, and furthermore are exceptionally stable. The oxygen-containing chlorophosphazenes employed thus have a more or less unlimited storage stability if moisture is excluded completely. If moisture is not excluded completely, the oxygen-containing chlorophosphazenes employed have the advantage that they do not lose, or lose very little of their activity. Furthermore, the oxygen-containing chlorophosphazenes employed have the advantage that they are soluble in many halogen-free organic solvents without the addition of solubilizing agent. Another advantage of the oxygen-containing phosphazenes employed is that liquid species are accessible which can also be employed without problems and without solvents, since in contrast to solids, they can be metered simply and accurately.

In the examples described below, all the parts and percentage data relate to the weight, unless stated otherwise. All the viscosity data are based on a temperature of 25° C. Unless stated otherwise, the examples below were carried out under a pressure of the surrounding atmosphere of 1000 hPa, and at room temperature at about 20° C., or at a temperature which is established when the reactants are brought together at room temperature without additional heating or cooling.

The following products and product mixtures are obtained in accordance with DE 22 29 514 B, cited above, by reaction of phosphorus pentachloride with ammonium chloride in a $PCl_5:NH_4Cl$ ratio in the range from 2:1 to 1.5:1:

Phosphazene A: $[PCl_3=N-PCl_2=N-PCl_3]^+[PCl_6]^-$

Phosphazene B: mixture of 5% of $[PCl_3=N-PCl_2=N-PCl_3]^+[PCl_6]^-$ and 95% of $[PCl_3=N(-PCl_2=N)_2-PCl_3]^+[PCl_6]^-$ Phosphazene C: mixture of 15% of $[PCl_3=N(-PCl_2=N)_3-PCl_3]^+[PC_6]^-$.

EXAMPLE 1

64.82 g (0.1 mole) of phosphazene A are dispersed in 100 ml of toluene in a flask with a stirrer and gas outlet, with exclusion of moisture. 3.6 g (0.2 mole) of deionized water are slowly metered into this mixture at room temperature, while stirring, such that the temperature of the mixture does not rise about 40° C. as a result of the exothermic reaction. The reaction has ended when the reaction mixture is homogeneous and no further HCl has escapes. The volatile constituents are removed at 30° C. under 100 Pa. 38.2 g of an ochre-colored oil from which colorless crystals precipitate after a short time at 0° C. remain. After 2 hours, the entire substance has solidified to a slightly yellowish, waxy solid.

Yield: 32.7 g of $PCl_3=N-PCl_2=N-PCl_2O$

Melting point: 34° C.

475 g of $\alpha,\omega$-dihydroxypolydimethylsiloxane having a viscosity of about 80 $mm^2s^{-1}$ and 25 g of $\alpha,\omega$-bis(trimethylsiloxy)polydimethylsiloxane having a viscosity of about 20 $mm^2s^{-1}$ are heated to 150° C. in a flask with a stirrer, and 0.30 ml of a solution of 1 g of $PCl_3=N-PCl_2=N-PCl_2O$ in 113.5 ml of toluene is added, while stirring. After addition of the catalyst, the pressure in the reaction vessel is reduced to about 100 Pa and the reaction mixture is stirred at 150° C. for an additional 10 minutes. The pressure is then increased again to the value of the surrounding air and 0.15 g of a basic siloxane mixture which has been prepared by reaction of 5 g of n-butyllithium with 250 g of $\alpha,\omega$-bis(trimethylsiloxy)polydimethylsiloxane having a viscosity of 350 $mm^2s^{-1}$ is added for deactivation of the catalyst. An $\alpha,\omega$-bis(trimethylsiloxy)polydimethylsiloxane having a viscosity of 4,000 $mm^2s^{-1}$ is obtained as the product, which is glass-clear, colorless and odorless and shows no change in properties, even after storage at temperatures of about 200° C. for several days.

EXAMPLE 2

9.0 g (0.5 mole) of deionized water are added to a solution of 126.4 g of phosphazene B in 250 ml of 1,2,3-trichloropropane in a flask with a gas outlet at 50° C. and the mixture is stirred at this temperature until no further HCl gas escapes. The solvent is then removed together with other volatile constituents at 80° C. and under 50 Pa. A brown oily liquid remains as the residue.

Yield: 69.4 g of a mixture of $HO-PCl_2=N-PCl_2=N-PCl_2O$ (5%) and $HO-PCl_2=N(-PCl_2=N)_2-PCl_2O$ (95%).

0.15 ml of a solution of 2 g of the mixture prepared above, of $HO-PCl_2=N-PCl_2=N-PCl_2O$ and $HO-PCl_2=N(-PCl_2=N)_2-PCl_2O$ in 40 ml of p-xylene is added to 240 g of $\alpha,\omega$-bis(trimethylsiloxy)polymethylhydridosiloxane having a viscosity of 25 $mm^2s^{-1}$ and 100 g of $\alpha,\omega$-bis(trimethylsiloxy)polydimethylsiloxane having a viscosity of 350 $mm^2s^{-1}$ in a flask with a stirrer at 120° C. and the mixture is stirred at this temperature for 10 minutes. After cooling to room temperature, 0.5 g of magnesium oxide is stirred into the reaction mixture to deactivate the catalyst and the mixture is then filtered. A siloxane having the average formula $Me_3Si[OSiMe_2]_{13.5}[OSiMeH]_{36.5}OSiMe_3$ is obtained as the product, which is glass-clear, colorless and odorless and shows no change in properties even after storage at temperatures of about 150° C. for several days. The $^{29}Si$-NMR spectrum shows that the dimethylsiloxy and methylhydridosiloxy units are randomly distributed. Less than 1/10 of the dimethylsiloxy units are still surrounded by two dimethylsiloxy units.

Comparison Example 1

The procedure described in Example 2 is repeated, with the modification that instead of 0.15 ml of a solution of 2 g of the mixture of $HO-PCl_2=N-PCl_2=N-PCl_2O$ and $HO-PCl_2=N(-PCl_2=N)_2-PCl_2O$ in 40 ml of p-xylene, 0.50 ml of a 1% strength solution of a phosphonitrile chloride, which is prepared in accordance with DE 22 29 514 B, cited above, and contains phosphorus and nitrogen in a ratio of 2:1, in 1,2,3-trichloropropane is employed.

A colorless, clear oil having a viscosity of 45 mm$^2$/s and of the average formula Me$_3$Si[OSiMe$_2$]$_{13.5}$[OSiMeH]$_{36.5}$OSiMe$_3$ is obtained as the product. The $^{29}$Si-NMR spectrum shows that the dimethylsiloxy and methylhydridosiloxy units are not randomly distributed. Half of the dimethylsiloxy units are still surrounded by two dimethylsiloxy units.

EXAMPLE 3

1,500 kg/hour of α,w-dihydroxypolydimethylsiloxane having a viscosity of about 120 mm$^2$s$^{-1}$ and 500 ml/hour of a 0.5% strength by weight solution of the mixture, prepared according to Example 2, of HO—PCl$_2$=N—PCl$_2$=N—PCl$_2$O (5%) and HO—PCl$_2$=N(—PCl$_2$=N)$_2$—PCl$_2$O (95%) in ethyl acetate are metered continuously into a screw reactor. The temperature in the reactor is 160° C. and the pressure is 6 kPa. After an average residence time of about 2 minutes, the catalyst is deactivated by continuous addition of 10 ml/hour of triisononylamine. An α,w-dihydroxypolydimethylsiloxane having a viscosity of about 350,000 mm$^2$s$^{-1}$ is obtained as the product, which is glass-clear, colorless and odorless.

Comparison Example 2

1,500 kg/hour of α,w-dihydroxypolydimethylsiloxane having a viscosity of about 120 mm$^2$s$^{-1}$ and 450 ml/hour of a 1% strength solution, prepared in accordance with DE 39 03 137 A, already cited, of an oxygen-free phosphonitrile chloride which is prepared in accordance with DE 22 29 514 B, already cited, by reaction of 2 mole of phosphorus pentachloride with 1 mole of ammonium chloride, in ethyl acetate containing 0.04% by weight of ammonium lauryl sulfate are metered continuously into a screw reactor. The temperature in the reactor is 160° C. and the pressure is 6 kPa. After an average residence time of about 2 minutes, the catalyst is deactivated by continuous addition of 20 ml/hour of triisononylamine. An α,w-dihydroxypolydimethylsiloxane having a viscosity of about 350,000 mm$^2$s$^{-1}$ is obtained as the product, which is glass-clear, colorless and odorless.

EXAMPLE 4

3.6 g (0.2 mole) of deionized water are added dropwise to a dispersion of 86.3 g (0.1 mole) of phosphazene C in 100 ml of toluene in a flask with a gas outlet at room temperature, while stirring. The rate of addition of the water is adjusted such that the temperature of the mixture does not rise above 40° C. as a result of the exothermic reaction. The reaction has ended when no further HCl gas escapes. The volatile constituents are removed at 40° C. under 200 Pa. A yellow-brown liquid remains.

Yield: 57.1 g of a mixture of PCl$_3$=N(—PCl$_2$=N)$_2$—PCl$_2$O (15%) and PCl$_3$=N(—PCl$_2$=N)$_3$—PCl$_2$O (85%)

600 kg/hour of an α,w-dihydroxypolydimethylsiloxane having a viscosity of about 120 mm$^2$s$^{-1}$, 500 ml/hour of a catalyst solution which contains 1.5% by weight of the phosphazene mixture, prepared above, of PCl$_3$=N(—PCl$_2$=N)$_2$—PCl$_2$O and PCl$_3$=N(—PCl$_2$=N)$_3$—PCl$_2$O in toluene and 80 kg/hour of an α,w-bis(vinyldimethylsiloxy)polydimethylsiloxane having a viscosity of 180 mm$^2$/s are fed continuously into a screw kneader. The temperature in the reactor is 160° C. and the pressure is less than 500 Pa. After an average residence time of about 3 minutes, the catalyst is deactivated by continuous addition of 300 ml/hour of 1,2-divinyl-1,1,2,2-tetramethyldisilazane. An α,w-bis(vinyldimethylsiloxy)polydimethylsiloxane having a viscosity of about 20,000 mm$^2$s$^{-1}$ is obtained as the product.

What is claimed is:

1. A process for the condensation and/or equilibration of an organosilicon compound in the presence of an oxygen-containing phosphazene.

2. The process as claimed in claim 1, wherein the oxygen-containing phosphazene is an oxygen-containing chlorophosphazene of the formula

$$Y-PCl_2=N(-PCl_2=N)_n-PCl_2O \qquad (I),$$

in which

Y represents a chlorine atom or the hydroxyl group and n represents 0 or an integer from 1 to 8, and/or a condensation product thereof.

3. The process as claimed in claim 2, wherein n is an integer from 1 to 3.

4. The process as claimed in claim 1, wherein the oxygen-containing chlorophosphazene is present in an amount of 0.1 to 1,000 ppm by weight based on the total weight of the organosilicon compound to be subjected to condensation and/or to be equilibrated.

5. The process as claimed in claim 1, wherein the oxygen-containing phosphazene is present as a mixture with a halogen-free organic solvent.

6. The process as claimed in claim 1, which is carried out at 50° C. to 200° C.

7. The process as claimed in claim 1, which is carried out at a pressure below 80 kPa.

* * * * *

UNITED STATES PATENT AND TRADEMARK OFFICE
CERTIFICATE OF CORRECTION

PATENT NO. : 5,380,902
DATED : January 10, 1995
INVENTOR(S) : Rudolf Hager, Otto Schneider and Johann Schuster It is certified that error appears in the above-indentified patent and that said Letters Patent is hereby corrected as shown below:

Column 1, line 57, after "preferably" delete "from 0 to 4" and insert in lieu of --- 0, or an integer from 1 to 4 ---.

Column 6, line 32, after "already" delete "know" in insert in lieu of --- known ---.

Signed and Sealed this

Twelfth Day of December, 1995

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,380,902
DATED : January 10, 1995
INVENTOR(S) : Rudolf Hager, Otto Schneider and Johann Schuster It is certified that error appears in the above-indentified patent and that said Letters Patent is hereby corrected as shown below:

Column 2, line 43, after "and" delete "-O-P=" and insert in lieu of --- -O-P= ---.

Signed and Sealed this

Twenty-seventh Day of February, 1996

Attest:

BRUCE LEHMAN

*Attesting Officer*  *Commissioner of Patents and Trademarks*